United States Patent Office 2,733,633
Patented Feb. 7, 1956

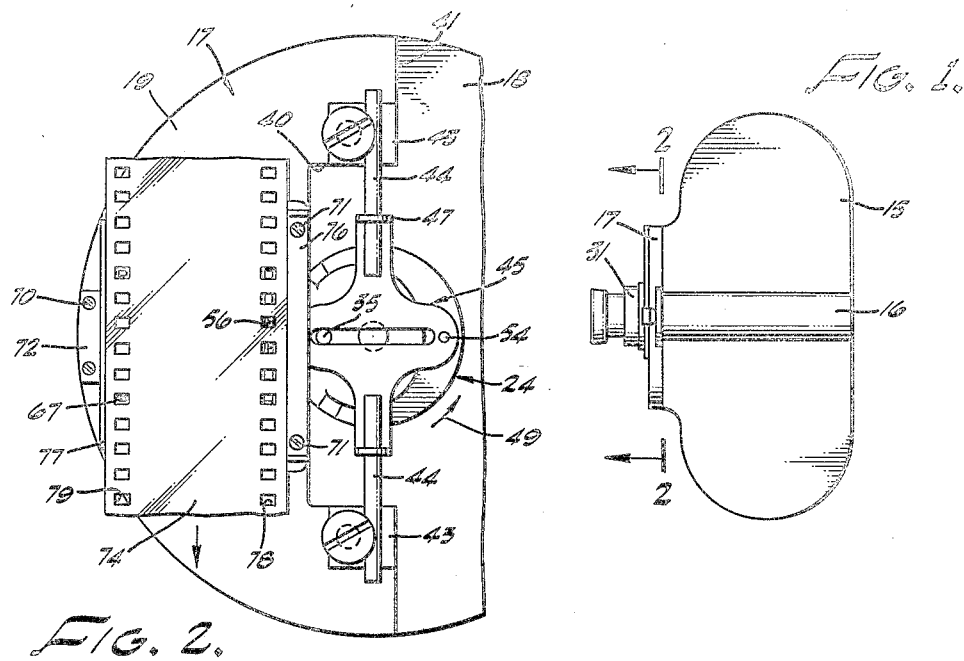

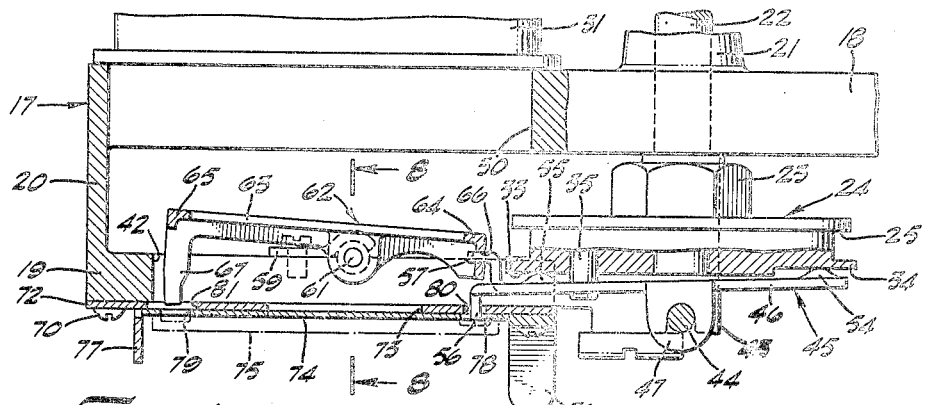
Fig. 4.
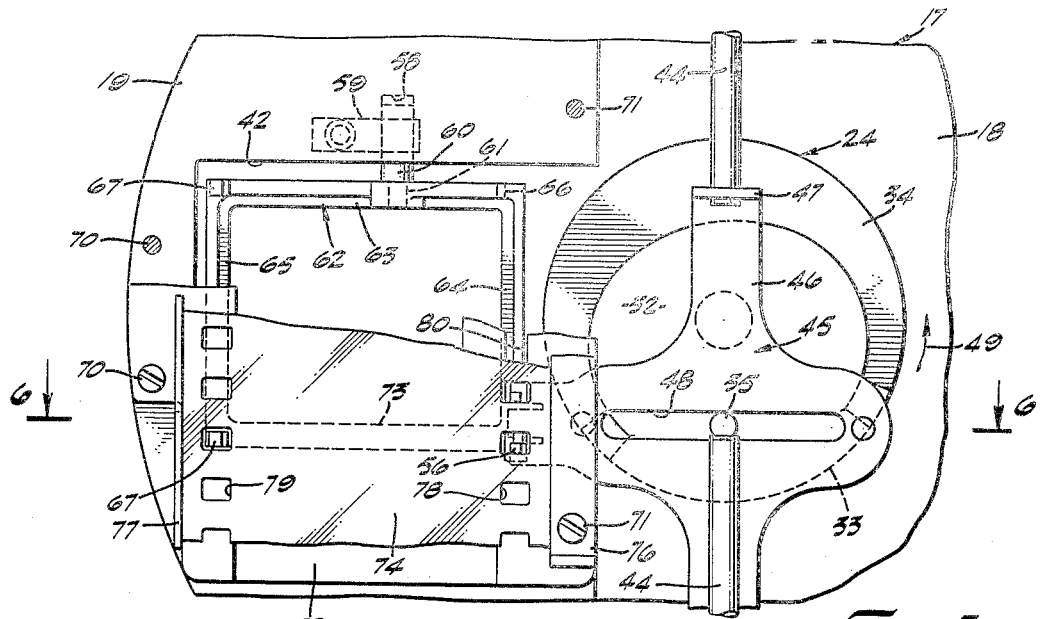
Fig. 5.
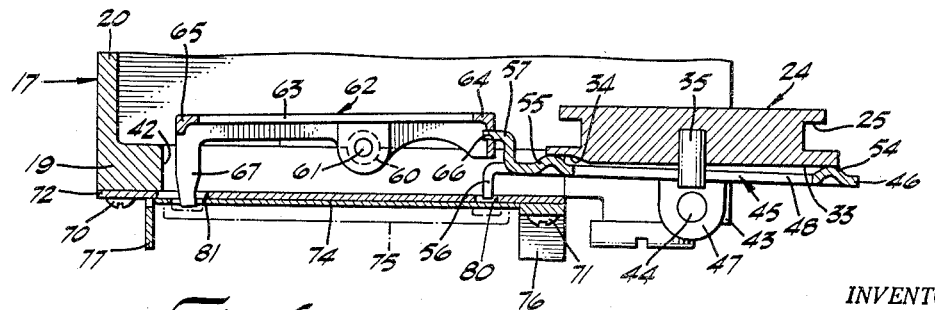
Fig. 6.
INVENTOR.
LEE R. WOTTRING
BY
ATTORNEY Feb. 7, 1956   L. R. WOTTRING   2,733,633
MOTION PICTURE FILM FEEDING AND REGISTERING MECHANISM
Filed Oct. 7, 1953   3 Sheets-Sheet 3
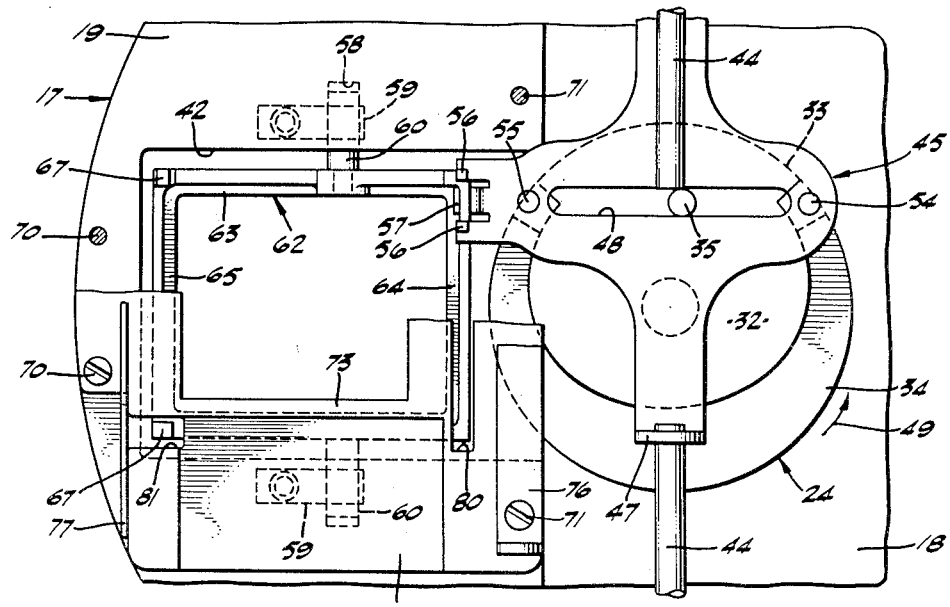
FIG. 7.
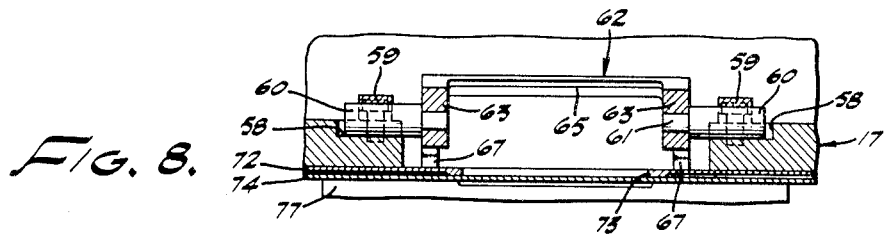
FIG. 8.
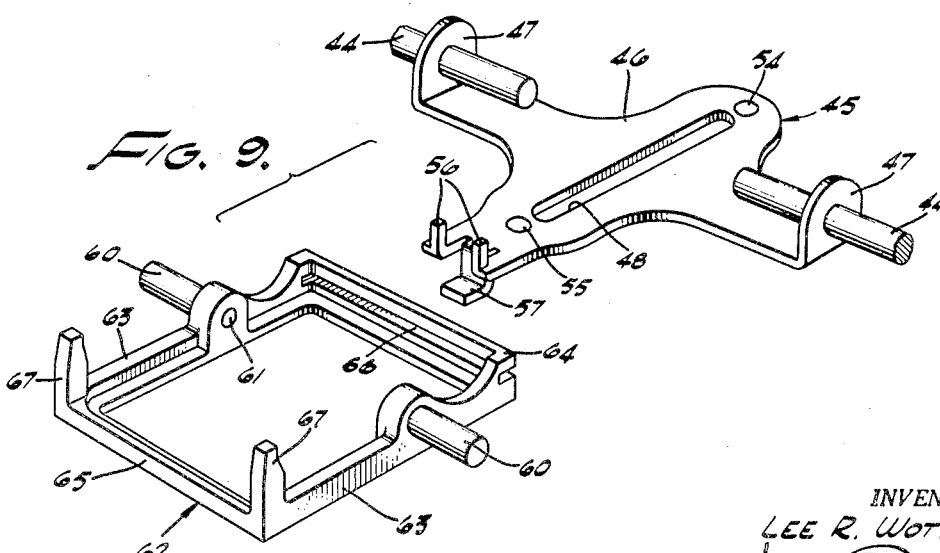
FIG. 9.
INVENTOR.
LEE R. WOTTRING
BY
ATTORNEY

2,733,633

MOTION PICTURE FILM FEEDING AND REGISTERING MECHANISM

Lee R. Wottring, Altadena, Calif.

Application October 7, 1953, Serial No. 384,690

8 Claims. (Cl. 88—18.4)

This invention relates to motion picture cameras and projectors and particularly to motion picture film feeding and registering mechanisms.

In the taking and exhibiting of motion pictures, it is becoming of increasing importance particularly in three dimensional work, to have a high degree of faithful registration of the individual frames of the film with the light apertures of both the cameras and the projection machines. It is accordingly an object of the present invention to provide a motion picture film feeding and registering mechanism by which film may be fed through either a motion picture camera or projector, which will produce a precise registration of each frame of film in the camera and which, in the projector, will reproduce these registrations whereby the clarity of the picture will be greatly enhanced.

It is another object of the invention to provide a means for accomplishing the foregoing object with relatively slight changes in what are presently well known standard motion picture cameras and projectors.

The manner of accomplishing the foregoing objects as well as further objects and advantages will be made manifest in the following description taken in connection with the accompanying drawings in which Fig. 1 is a side elevational diagrammatic view of a motion picture camera which is equipped with a preferred embodiment of the invention.

Fig. 2 is an enlarged fragmentary view taken on line 2—2 of Fig. 1 showing a section of the film in the camera where this overlies the aperture plate and with the latter overlying the left end of the film advancing shuttle of the camera, and with the shuttle itself overlying the shuttle reciprocating and rocking cam.

Fig. 3 is an enlarged fragmentary view similar to Fig. 2 with the film partly broken away to reveal details of the structure of the aperture plate and shuttle.

Fig. 4 is a horizontal sectional view taken on line 4—4 of Fig. 3 and with the parts still in the same positions during which a film feeding cycle is taking place with the shuttle engaging and feeding the film.

Fig. 5 is a view similar to Fig. 4 showing the conclusion of the film feeding cycle being performed in Fig. 4 and the beginning of a film registering cycle which occupies the period intervening between the conclusion of each film shifting cycle and the beginning of the next succeeding film shifting cycle.

Fig. 6 is a horizontal sectional view taken on line 6—6 of Fig. 5 and with the parts in the same positions relative to each other.

Fig. 7 is a view similar to Fig. 5 and illustrates a point in the operation of the invention close to the close of the film registration cycle illustrated in Figs. 5 and 6 and at the beginning of the succeeding film feeding cycle.

Fig. 8 is a detail cross-sectional view taken on line 8—8 of Fig. 4 and showing the construction of the film registration pin frame of the invention and of the means for pivotally mounting the same on the frame of the camera.

Fig. 9 is a composite perspective view of the shuttle and registration pin frame of the invention with said elements in their normally related positions excepting that they are slightly drawn apart to withdraw the registration pin frame rocking lug from the slot in said frame for receiving the same.

Referring specifically to the drawings, the invention is shown as incorporated in a camera 15 having a viewer 16 alongside thereof, for assistance in getting a subject properly positioned before the camera, and a circular front cover 17. All of Figs. 2, 3, 5 and 7 are taken looking at the rear of said front cover along the line 2—2 of Fig. 1.

The cover 17 has a front wall 18 and a substantially semi-circular rear wall 19, the space between said two walls being covered by a cylindrical outer wall 20. The front wall 18 has a bearing 21 therein which is coaxial with the cover 17 and has a shaft 22 mounted therein, the latter having a nut 23 tightened against the rear face of wall 18 to secure said shaft in place, said shaft extending rearwardly from said nut to rotatably support a shuttle cam 24. The cam 24 has a peripheral groove 25 over which a belt (not shown) is trained to rotate said cam on said shaft from a power mechanism provided in the camera.

The front wall 18 has a wide light opening 30 which registers axially with a light focusing unit 31 (Figs. 1 and 4) mounted on the front face of the cover 17.

The cam 24 has a cam face 32 which is exposed rearwardly and includes a high cam section 33, and a low cam section 34. Mounted in the cam 24 and extending rearwardly therefrom in a radial line close to the middle of low cam section 34 is an eccentric shuttle-actuating crank pin 35 the purpose of which will be made clear hereafter.

The rear wall 19 has a wide recess 40 formed in its diametral edge 41 (Fig. 2) and a large central recess 42, opening radially from the middle of recess 40. Secured in clamps 43 mounted on the wall 19 at opposite ends of the recess 40 are aligned shuttle shafts 44 on which a film feeding shuttle 45 is slidably and pivotally mounted.

The shuttle 45 has a sheet metal body 46 from which bearing ears 47 are bent, bearing holes formed therein being in alignment and slidably receiving the shafts 44. The shuttle body 46 is in the general form of a cross and has a slot 48 extending crosswise thereof at right angles to the shafts 44. This slot slidably receives the crank pin 35 whereby the shuttle 45 is reciprocated by rotation of the cam 24 in the direction of the arrow 49. Bosses 55 are outstruck from the shuttle body 46 adjacent opposite ends of the slot 48 so that said bosses remain substantially constantly in contact with the cam 24.

Provided on one of the lateral extremities of the shuttle 45 is a pair of outstruck film advancing fingers 56 which extend rearwardly from the shuttle. The precise location, spacing and purpose of the fingers 56 will be pointed out in detail hereinafter.

Outstruck from the metal of the shuttle 45, at a point located between the fingers 56, and extending forwardly and radially from the shuttle is a lug 57. The fingers 56 and lug 57 are disposed in the inner edge portion of the recess 42 (Figs. 4 and 6).

Provided on forward faces of those portions of the wall 19 adjacent upper and lower edges of the recess 42 (Figs. 6, 7 and 8) are semi-cylindrical grooves 58 and clamps 59 which clamp stub shafts 60 tightly in said grooves. The shafts 60 are in alignment and have inner end portions 61 of reduced diameter which form pivots for a rectangular registration frame 62. This frame includes end members 63, which receive the pivots 61, and side members 64 and 65. Formed in side member 64, throughout its length, is a slot 66 into which the lug 57 extends (Figs. 4 and 6). Formed on the frame 62 to extend inwardly therefrom at opposite ends of the frame member 65 are registration pins 67.

Secured to the rear face of wall 19 by screws 70 and 71 is an aperture plate 72 having a rectangular light aperture 73 provided therein for admitting light for the photographic exposure of a film 74 which is yieldably held against the back face of said aperture plate by a pressure device 75, the construction and operation of which is well known in the art so that it is only diagrammatically shown in phantom in Figs. 4 and 6. The plate 72 includes side guides 76 and 77 which guide a film 74 with a high degree of accuracy along a given vertical feeding path.

The film 74 is of the usual type of 35 millimeter motion picture film having rows of like perforations 78 and 79 along its inner and outer edges.

The light aperture plate 72 has a slot 80 aligned with the row of perforations 78, and extending the full vertical length of the light aperture 73 in said plate. The feed fingers 56 of the shuttle 45 are aligned with the slot 80 and extend rearwardly through said slot and into an adjacent pair of perforations 78 during that portion of each rotation of the cam 24 which accomplishes the feeding of the film 74 the length of one exposure frame on said film.

The light aperture plate 72 is also provided with a pair of openings 81 which are in alignment with the film perforations 79 and are positioned to permit registration pins 67 to extend through the plate 72 and into registering relation with a pair of perforations 79 during that portion of each rotation of the operating cam 24, when the feed fingers 56 are withdrawn from the film and the shuttle 45 is returning to its starting position.

Operation

The cam 24 is given one rotation for each picture taken on the film 74. During part of each such rotation, the film is being moved downward the length of a single photographic frame. During the balance of said rotation, the film is stationary. The photographic frame of the film 74 which is opposite the light aperture 73 is exposed to light passing through a shutter provided in the mechanism 31 while the film 74 is stationary. This occurs, of course, while the fingers 56 are withdrawn from the perforations 78 as shown in Fig. 6. As shown in this view, the registration frame 62 is rocked by the lug 57 when the shuttle 45 is rocked by the cam 24 to withdraw the fingers 56 from the perforations 78. This rocking of the registration frame 62 causes the registration pins 67 to extend rearwardly through the openings 81 and into a pair of film perforations 79 which are located at the adjacent upper and lower corners of the light aperture 73.

The pins 67 are made to fit the perforations 79 sufficiently closely to give the film 74 a relatively precise registration during the taking of each picture. While I prefer to use two registration pins 67, as above described, for performing the film registration function, this function might under some circumstances be performed satisfactorily by a single registration pin.

The same mechanism described hereinabove for use in a camera is likewise adapted for use in a motion picture projector and when so used achieves the same accurate registration of the film 74 in a projector which is achieved by the present invention in the camera at the time the film is exposed. Thus, where three dimensional pictures are taken and projected, and which requires the use of two separate films, and that the picture projected from one film be seen exclusively by one eye and the picture projected from the other film be seen exclusively by the other eye, the use of the present invention assures a relatively correct relationship of the subject matter appearing in the two projections and viewed respectively and simultaneously by the two eyes of the observer.

The manner in which the rotation of cam 24 accomplishes the reciprocation of the shuttle 45 and the insertion of fingers 56 into film perforations 78 at the beginning of the feed cycle and the withdrawal therefrom at the end of the feed cycle, is well known in the art, and it is believed a brief description of this will be sufficient for present purposes.

Figs. 2, 3 and 4 illustrate the mid point in a film feeding cycle in which the shuttle is being driven downwardly with the fingers 56 extending into film perforations 78 as clearly shown in Fig. 4. It is here to be noted that the high section 33 of the cam face 32 is disposed opposite boss 55 and the low section 34 of said face is disposed opposite boss 54. The cant thus given the shuttle 45 causes the lug 57 to rock the frame 62 to withdraw the pins 67 from the film perforations 79. This shows that during the feeding of the film 74 downwardly by the fingers 56 the pins 67 are in withdrawn positions to permit this feeding to take place.

Figs. 5 and 6 illustrate the rod 35 at dead center just following the conclusion of the film feeding movement and the reverse rocking of the shuttle 45 to withdraw the fingers 56 from the film and extend the pins 67 into registering relation therewith. As the cam 24 continues to rotate in the direction of arrow 49, the crank pin 35 operates on the walls of the slot 48 to return the shuttle 45 upwardly while retaining the shuttle in the canted position in which it is shown in Fig. 6 with the fingers 56 withdrawn from the film and with the lug 57 sliding in the slot 66 and retaining the pins 67 in registering relation with the film.

Upon arriving at the upper end of its return cycle the shuttle 45 is positioned as shown in Fig. 7 where the cam faces 33 and 34 act upon the bosses 54 and 55 to rock the shuttle 45 back to the position in which it is shown in Fig. 4 with the fingers 56 extending into a fresh pair of film perforations 78. This rocking of shuttle 45, of course, also withdraws the registration pins 67 from the film 74 whereby these pins do not interfere with the ensuing feeding movement of the film which starts immediately as the crank pin 35 continues to rotate anti-clockwise from its upper position, shown in Fig. 7 with the cam 24.

The claims are:

1. In a mechanism for intermittently advancing a motion picture film across a light aperture in a camera, projector or the like, the combination of: means for guiding said film to facilitate travel of the latter along a straight path across said aperture; a shuttle having film-perforation-engaging fingers and a rocking lug; means for reciprocating said shuttle along a path parallel with the direction of travel of said film; means for shifting said shuttle at one terminal of its path to extend said fingers into perforations in said film and maintain said fingers so extended during a film feeding movement of said shuttle which follows, and for then shifting said shuttle to withdraw said fingers from said perforations and withhold said fingers from said perforations during the return movement of said shuttle; a frame pivotally mounted on an axis parallel with the direction of film travel, said frame having a slot parallel with said axis and receiving said shuttle lug whereby said lug remains at all times in said slot while traveling back and forth relative to said frame with said shuttle; and a registration pin mounted on said frame, the latter being rocked by said lug to extend said pin into a perforation in said film upon the shifting of said shuttle to withdraw said fingers from certain film perforations, said pin being withdrawn from said film by said lug reversely rocking said frame when said shuttle is shifted to extend said fingers into perforations in said film.

2. A combination as in claim 1 in which said shuttle is slidably mounted on and rockable about an axis disposed along said film and parallel with the direction of travel thereof and in which said registration frame surrounds said light aperture and the axis of rotation of said frame lies parallel with and close to said film and on the opposite side of said lug from said shuttle.

3. In a mechanism for intermittently advancing a motion picture film across a light aperture in a camera, projector or the like, the combination of: a frame surrounding said light aperture; means for pivotally mounting said frame on an axis crossing said light aperture; registration pin means on said frame along one edge thereof, said pin means being adapted to extend into one or more perforations provided in said film along the adjacent edge of the latter; film feed means having fingers which extend into perforations provided along the opposite edge of the film, said frame having a slot parallel with its pivotal axis, said slot being disposed close to said fingers; a lug provided on said film feed means, said lug extending into said slot so as to remain therein during the operation of said film feed means; and means to shift said film feed means to withdraw said fingers from said perforations and swing said frame to extend said pin means into one or more corresponding film perforations at the conclusion of a film feeding movement of said feed means, the latter then returning, with said pins withdrawn, to its starting position and again shifting to extend said fingers into advanced perforations of said film, said lug thereby rocking said frame to withdraw said pin means from said film to free said film to be fed by the ensuing movement of said feed means.

4. In a motion picture film feeding mechanism, the combination of: a frame having a light aperture; means guiding a perforated motion picture film for movement along a path crossing said aperture; a feed shuttle slidably mounted on said frame for reciprocation parallel with said film, said shuttle having fingers aligned with perforations of said film and being shiftable to extend said fingers into certain of said perforations or to withdraw said fingers therefrom; film registering means on said frame having pins which are adapted to be shifted to extend said pins into certain of said perforations to accurately register a given frame of said film with said aperture or to be withdrawn from said perforations to free said film for feeding; shuttle actuator means for imparting reciprocatory movement to said shuttle and shifting said shuttle at each reversal of direction whereby said fingers are extended into film perforations at one terminus of said reciprocatory movement and from said perforations at the opposite terminus thereof, causing the intermittent feeding of said film; and means apart from said shuttle actuator means and directly connecting said shuttle to said film registering means to transmit said finger shifting movements of said shuttle directly to said film registering means to extend said pins into film perforations coincidental with each withdrawal of said fingers from film perforations and vice versa, said connecting means slidably relating said shuttle and said registering means to produce the connection stated therebetween notwithstanding the rerciprocation of said shuttle.

5. In a motion picture feeding and registering mechanism, the combination of: a frame having a light aperture provided therein; means for guiding a motion picture film for movement along a path crossing said aperture; a feed shuttle slidably mounted on said frame for reciprocation parallel with said film, said shuttle having fingers aligned with perforations of said film and being rockable about an axis parallel with said film to shift said fingers into or out of said perforations; a registration rocker pivotally mounted on said frame on an axis parallel with said film, said rocker having pins aligned with perforations of said film and being rockable to shift said pins into or out of said perforations; shuttle actuator means directly engaging said shuttle to reciprocate the same and rock said shuttle reversely at the opposite ends of its path of reciprocation to position said fingers in said perforations when travelling in one direction and out of the same when travelling in the opposite direction, thereby feeding said film intermittently in said one direction; and means apart from said actuator means and directly connecting said shuttle to said rocker whereby rocking movement received by said shuttle from said actuator means is directly transmitted from said shuttle through said connecting means to said rocker to rock the latter to extend said pins into film perforations when said fingers are withdrawn from film perforations and vice versa.

6. A combination as in claim 5 in which said connecting means comprises a slot formed in said rocker parallel with said film; and a lug on said shuttle which travels back and forth in said slot to directly transmit rocking movement of said shuttle to said rocker but leaving the shuttle free to reciprocate relative to said rocker.

7. A combination as in claim 6 in which said shuttle and said rocker rock about different spaced parallel axis and are connected by said connecting means whereby said shuttle and said rocker coordinately rock in opposite directions.

8. A combination as in claim 7 in which the rocking axis of said shuttle is alongside said film and substantially in the same plane therewith, whereas the axis of said rocker is out of the plane of said film and crosses said aperture.

References Cited in the file of this patent

UNITED STATES PATENTS

| | | |
|---|---|---|
| 1,663,625 | Debrie | Mar. 27, 1928 |
| 2,351,886 | Sperry | June 20, 1944 |